(12) United States Patent
Zhou

(10) Patent No.: US 10,795,479 B2
(45) Date of Patent: Oct. 6, 2020

(54) TOUCH CONDUCTIVE FILM, TOUCH MODULE, AND DISPLAY DEVICE

(71) Applicants: IVTOUCH CO., LTD, Jiangsu (CN); SVG TECH GROUP CO., LTD, Jiangsu (CN); Soochow University, Jiangsu (CN)

(72) Inventor: Xiaohong Zhou, Jiangsu (CN)

(73) Assignees: IVTOUCH CO., LTD, Jiangsu (CN); SVG TECH GROUP CO., LTD, Jiangsu (CN); Soochow Univeristy, Jiangsu (CN)

( * ) Notice: Subject to any disclaimer, the term of this patent is extended or adjusted under 35 U.S.C. 154(b) by 0 days.

(21) Appl. No.: 16/335,091

(22) PCT Filed: May 17, 2017

(86) PCT No.: PCT/CN2017/084686
§ 371 (c)(1),
(2) Date: Mar. 20, 2019

(87) PCT Pub. No.: WO2018/054072
PCT Pub. Date: Mar. 29, 2018

(65) Prior Publication Data
US 2019/0220125 A1    Jul. 18, 2019

(30) Foreign Application Priority Data

Sep. 23, 2016   (CN) .......................... 2016 1 0846762

(51) Int. Cl.
*G06F 3/041*   (2006.01)
*G06F 3/044*   (2006.01)

(52) U.S. Cl.
CPC ............ *G06F 3/0412* (2013.01); *G06F 3/044* (2013.01); *G06F 3/0446* (2019.05);
(Continued)

(58) Field of Classification Search
CPC ............... G06F 3/04164; G06F 3/0446; G06F 2203/04103; G06F 2203/04112; G06F 3/0412; G06F 3/04
See application file for complete search history.

(56) References Cited

U.S. PATENT DOCUMENTS

2014/0293148 A1*  10/2014  Tang .................... H05K 1/0306
                                                    349/12

FOREIGN PATENT DOCUMENTS

| CN | 103871547 A | 6/2014 |
| CN | 104020887 A | 9/2014 |
| CN | 106354353 A | 1/2017 |

OTHER PUBLICATIONS

State Intellectual Property Office of the P.R. China, International Search Report and Written Opinion for International Application No. PCT/CN2017/084686, dated Aug. 23, 2017.

* cited by examiner

*Primary Examiner* — Muhammad N Edun
(74) *Attorney, Agent, or Firm* — Honigman LLP; Matthew H. Szalach; Jonathan P. O'Brien

(57) ABSTRACT

A touch conductive film comprises a substrate and an electrically-conductive grid formed on the substrate. Cells of the electrically-conductive grid in a visible region and a non-visible region of the substrate are integrally formed with one another. Also provided are a touch module employing the touch conductive film and a display device. The touch conductive film of the invention has a simple structure, can be manufactured conveniently, and has lower costs. Moreover, the invention has better stability, thereby correspondingly reducing manufacturing costs and assembly costs.

13 Claims, 8 Drawing Sheets

(52) U.S. Cl.
CPC .................... *G06F 3/04164* (2019.05); *G06F 2203/04103* (2013.01); *G06F 2203/04112* (2013.01)

TOUCH CONDUCTIVE FILM, TOUCH MODULE, AND DISPLAY DEVICE

This application is the national phase of International Patent Application No. PCT/CN2017/084686, titled "TOUCH CONDUCTIVE FILM, TOUCH MODULE, AND DISPLAY DEVICE", filed on May 17, 2017, which claims priority to Chinese Patent Application No. 201610846762.2, titled "TOUCH CONDUCTIVE FILM, TOUCH MODULE, AND DISPLAY DEVICE", filed with the Chinese Patent Office on Sep. 23, 2016, both of which are incorporated herein by reference in their entireties.

FIELD

The present disclosure relates to a conductive film, in particular to a touch conductive film for touch display, as well as a touch module and a display device using the same.

BACKGROUND

The touch screen, as a new type human-computer interaction interface, is widely used in various digital information systems for its advantages of being ease to use, robustness, a fast response and space saving. For a long time, the resistive touch screens are mainly used in practice. However, with the global popularity of iPhone mobile devices, the projected capacitive touch screens are used increasingly, and have an improved influence in touch screen market. Therefore, the projected capacitive touch screen will be developed greatly in the future due to the enriched and comfortable user experience.

Currently, the projected capacitive touch screens are mainly applied to various mobile phones. As the Windows operating system supporting touch screens is published, the application of touch screens to devices such as notebooks and tablets is greatly facilitated. In addition, vehicle-mounted multi-media systems, e-books, smart home appliances and medium and large sized LCD TVs using projected capacitive touch screens also facilitate the development of the projected capacitive touch screens.

The projected capacitive touch screen is favored by users due to comfortable user experience, supporting multi-gesture and multi-touch, natural high transmittance and high definition. It is unable to meet the demand for a larger touch screen in the market with the conventional solutions.

At present, the touch conductive film of the conventional projected capacitive touch screen generally includes lead channels and conductive channels which are separated from each other, resulting in a difficulty in alignment of the lead channels and the conductive channels. In addition, the touch conductive film may be broken off easily, resulting in a poor stability and a low yield and causing an increase in process steps and man-hours.

SUMMARY

A touch conductive film with good stability and high production yield is provided according to the present disclosure, to solve the problems of poor stability and low production yield of the conventional touch conductive film caused by reasons that it is difficult to perform alignment process and breaking-off is easy to happen.

A touch conductive film is provided according to an embodiment of the present disclosure, which includes a substrate and conductive grids formed on the substrate. A conductive grid in a visible region of the substrate is integrally formed with a conductive grid in a non-visible region of the substrate.

In an embodiment, the visible region is arranged with multiple first grooves, the non-visible region is arranged with multiple second grooves, the conductive grid in the visible region and the conductive grid in the non-visible region are respectively arranged in the first grooves and the second grooves.

In an embodiment, a distance between adjacent first grooves is greater than a distance between adjacent second grooves.

In an embodiment, the distance between adjacent first grooves is 10 times to 50 times of the distance between adjacent second grooves.

In an embodiment, longitudinal sections of the first grooves and/or the second grooves are rectangles, inverted trapezoids, or a combination of rectangles and inverted trapezoids.

In an embodiment, the inverted trapezoid has a greater width at an opening than at a bottom.

In an embodiment, each of grid units of the conductive grids has a rectangular shape, a rhombus shape, or an irregular shape.

In an embodiment, the substrate includes a base layer and a UV adhesive layer, the UV adhesive layer is arranged on the base layer, the first grooves and the second grooves are arranged on the UV adhesive layer.

In an embodiment, each of the first grooves in the visible region extends to a second groove in the non-visible region.

In an embodiment, auxiliary connecting wires are arranged between the visible region and the non-visible region, the auxiliary connecting wires are integrally formed with the conductive grid in the visible region and the conductive grid in the non-visible region.

In an embodiment, the visible region is arranged with multiple conductive channels insulated from each other and multiple non-conductive channels formed by cutting the conductive grid, and the non-visible region is arranged with multiple lead channels insulated from each other.

In an embodiment, each of the conductive channels is electrically connected to the outside via a lead channel, and one conductive channel is electrically connected to the outside via one or more lead channels.

In an embodiment, the non-visible region is arranged with a grounded shielding line, the grounded shielding line is arranged between the visible region and the lead channels, or is arranged between the lead channels and an edge of the touch conductive film.

A touch module is further provided according to the present disclosure, which includes the touch conductive film. The touch conductive film includes a substrate and conductive grids formed on the substrate, and a conductive grid in a visible region of the substrate is integrally formed with a conductive grid in a non-visible region of the substrate.

A display device is further provided according to the present disclosure, which includes the touch conductive film. The touch conductive film includes a substrate and conductive grids formed on the substrate, and a conductive grid in a visible region of the substrate is integrally formed with a conductive grid in a non-visible region of the substrate.

Compared with the conventional technology, in the touch conductive film according to the present disclosure, the conductive grid in the visible region is integrally formed with the conductive grid in the non-visible region, such that alignment and compression joint processes are not required. Therefore, the touch conductive film according to the present disclosure has advantages of a simple structure, being easy to manufacture and a low cost. Moreover, the stability of the touch conductive film is also improved and the inconvenience caused by a secondary connection is avoided, thereby reducing the manufacturing cost and the assembly cost.

BRIEF DESCRIPTION OF THE DRAWINGS

FIG. 2 is a schematic diagram showing another connection between lead channels in a non-visible region and a conductive channel in a visible region of a touch conductive film according to the present disclosure.

DETAILED DESCRIPTION OF EMBODIMENTS

Figure 1:
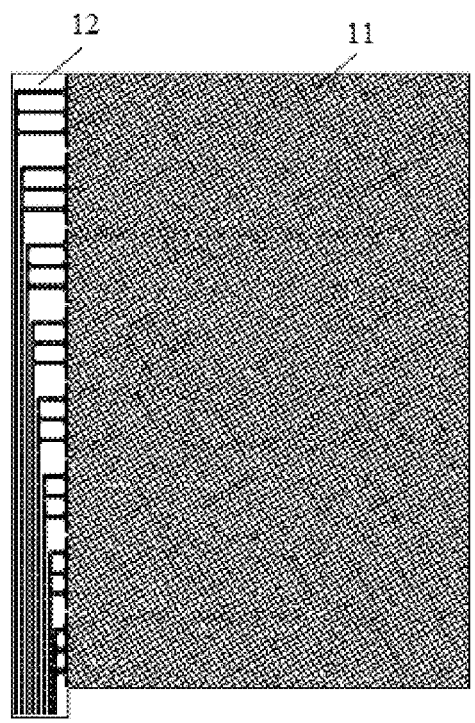
FIG. 1 is a schematic structural diagram of a visible region and a non-visible region of a touch conductive film according to the present disclosure.

In order to understand the present disclosure more clearly, the present disclosure is described more fully in conjunction with the drawings hereinafter. Preferred embodiments of the present disclosure are shown in the drawings. However, the disclosure may be embodied in many different manners and is not limited to the embodiments described herein. Rather, these embodiments are provided to make the present disclosure more fully understood.

It should be noted that when an element is referred to as being "fixed" to the other element, it can be directly on the other element or another element is existed between them. When an element is considered to be "connected" to the other element, it can be directly connected to the other element or another element is connected between them.

All technical and scientific terms used herein have the same meaning as commonly understood by one of ordinary skill in the art to which this disclosure belongs, unless otherwise defined. Terms used in the present disclosure are aimed at describing particular embodiments and are not aimed to limit the present disclosure. The term "and/or" used herein includes any and all combinations of one or more of the related listed items.

Referring to FIG. 1 to FIG. 4, a touch conductive film is provided according to an embodiment of the present disclosure. The touch conductive film includes a substrate 20 and conductive grids formed on the substrate 20. The conductive grid in a visible region 11 of the substrate 20 and the conductive grid in a non-visible region 12 of the substrate 20 are integrally formed. Specifically, the visible region 11 is arranged with multiple first grooves 24, and the non-visible region 12 is arranged with multiple second grooves 25. The first grooves 24 and the second grooves 25 are filled with conductive material 21, to form the conductive grids. That is, the conductive grids are respectively arranged in the first grooves 24 and the second grooves 25.

Figure 3:
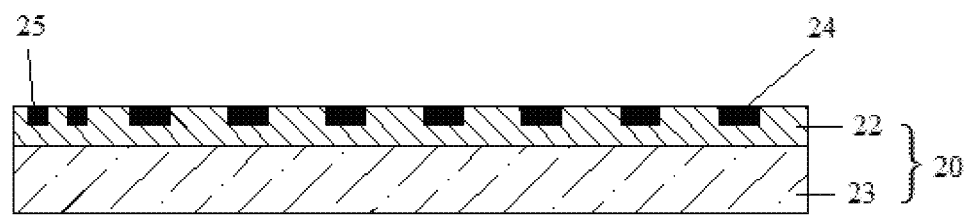
FIG. 3 is a schematic side structural diagram of a touch conductive film according to the present disclosure.

In an embodiment shown in FIG. 3, the substrate 20 includes a base layer 23 and a UV adhesive layer 22. The UV adhesive layer 22 is arranged on the base layer 23, and the first grooves 24 and the second grooves 25 are arranged on the UV adhesive layer 22.

Figure 4:
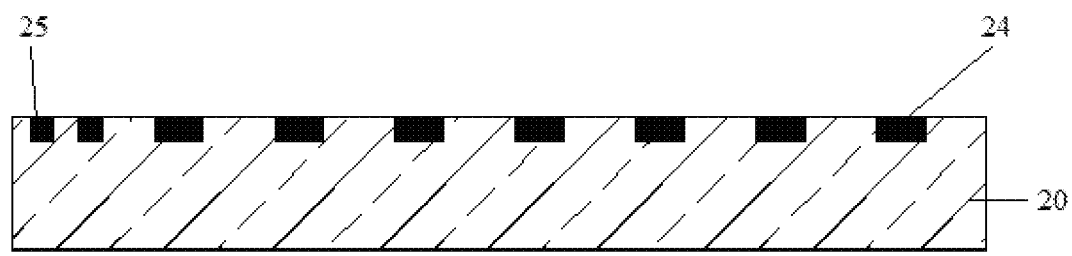
FIG. 4 is a schematic side structural diagram of another touch conductive film according to the present disclosure.

In an embodiment shown in FIG. 4, the first grooves 24 and the second grooves 25 are directly formed on the substrate 20. The first grooves 24 and the second grooves 25 may be formed on the substrate 20 via a conventional imprint process.

Figure 2:
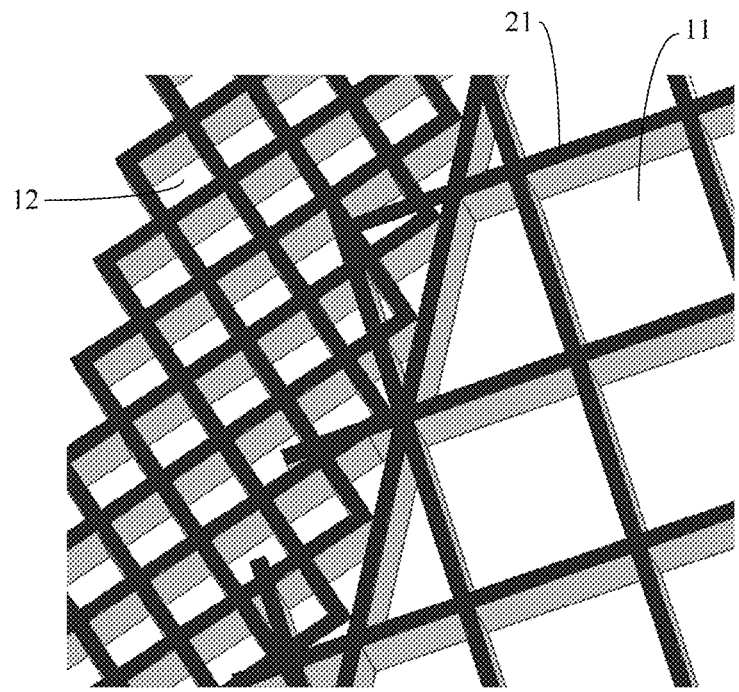
FIG. 2 is a schematic partially enlarged structural diagram of conductive grids in a visible region and a non-visible region of a touch conductive film according to the present disclosure.

In FIG. 2, each of the first grooves 24 in the visible region 11 extends to a second groove 25 in the non-visible region 12. That is, the conductive material 21 in the visible region 11 extends into the non-visible region 12 and is connected with the conductive material 21 in the non-visible region 12. In the embodiment, the conductive material 21 in the visible region 11 which extends into the non-visible region 12 is also integrally formed with the conductive material 21 in the non-visible region 12. That is, the conductive material 21 in the visible region 11 of the touch conductive film is integrally formed with the conductive material 21 in the non-visible region 12 of the touch conductive film, thus no alignment and compression joint process are required. In this way, the touch conductive film has a simple structure and a low cost, and is manufactured conveniently. Moreover, the stability of the touch conductive film is improved and the inconvenience caused by the secondary connection is avoided.

Figure 5:
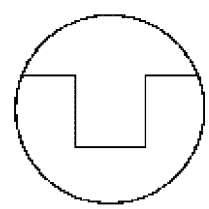
FIG. 5 is a schematic enlarged structural diagram of a groove of a touch conductive film according to the present disclosure.
Figure 6:
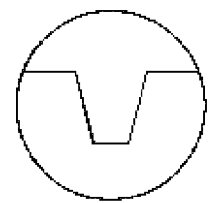
FIG. 6 is a schematic enlarged structural diagram of a groove of another touch conductive film according to the present disclosure.

Further, a distance between adjacent first grooves 24 is greater than a distance between adjacent second grooves 25. Preferably, the distance between adjacent first grooves 24 is 10 times to 50 times of the distance between adjacent second grooves 25. In addition, the first grooves and/or the second grooves may be designed to have different longitudinal sections according to actual needs, such as rectangular longitudinal sections, inverted trapezoid longitudinal sections or a combination of the above, as shown in FIG. 5 and FIG. 6. Referring to FIG. 6, in a case that the first grooves 24 and/or the second grooves 25 have inverted trapezoid longitudinal sections, the inverted trapezoid longitudinal section has a greater width at the opening than at the bottom. That is, the inverted trapezoid longitudinal section has a width gradually increased in a direction away from the substrate 23.

Figure 7:
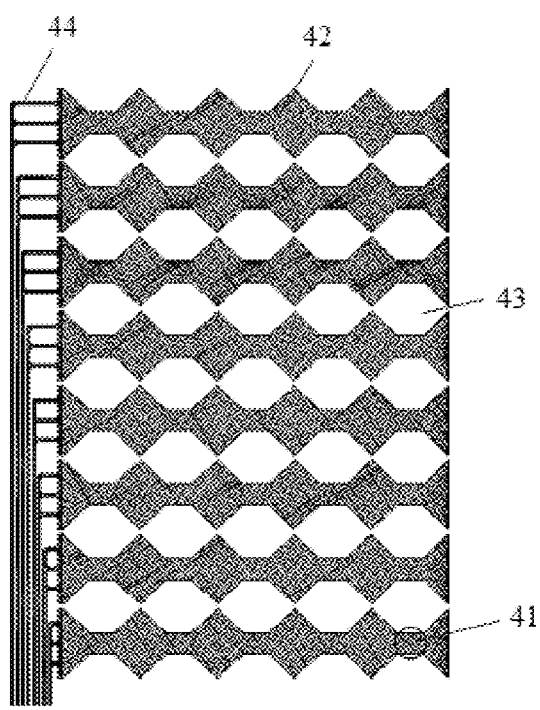
FIG. 7 is a schematic structural diagram of an internal channel of a touch conductive film according to the present disclosure.
Figure 8:
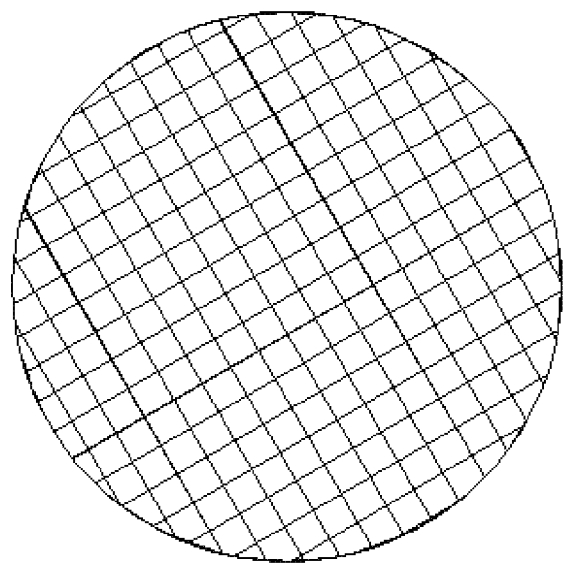
FIG. 8 is a schematic enlarged structural diagram of a grid unit shown in FIG. 7.
Figure 9:
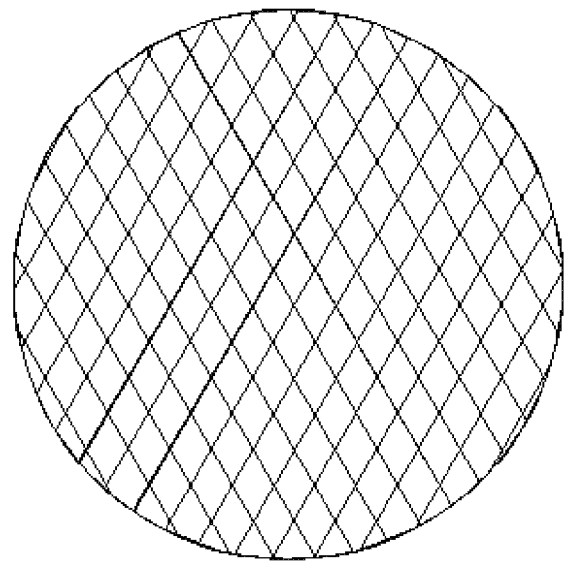
FIG. 9 is a schematic enlarged structural diagram of another grid unit shown in FIG. 7.

Referring to FIG. 7 to FIG. 9, the conductive grid includes multiple grid units, with which conductive channels 42 and non-conductive channels 43 are formed. The grid unit 41 may be designed to have a different shape according to actual needs, such as a rectangular shape (including squares), a rhombus shape, an irregular shape or another suitable shape, as shown in FIGS. 8 and 9.

Figure 10:
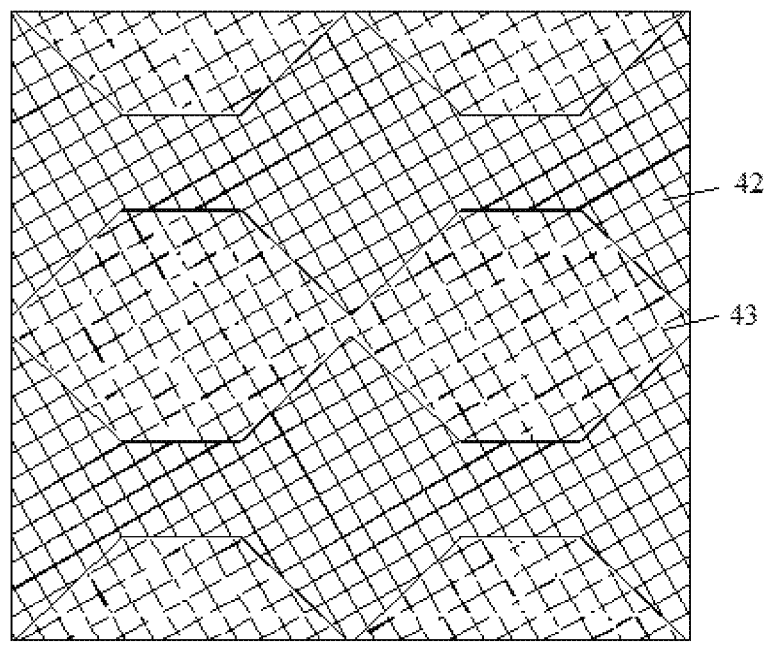
FIG. 10 is a schematic structural diagram of a non-conductive channel in a visible region of a touch conductive film according to the present disclosure.
Figure 11:
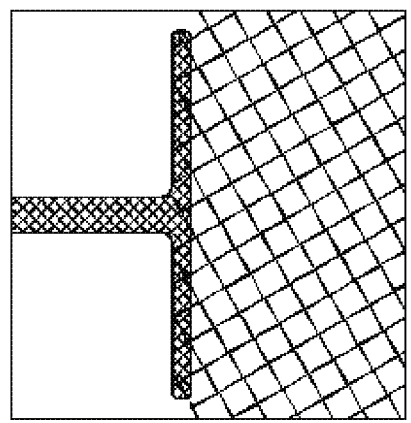
FIG. 11 is a schematic diagram showing a connection between a lead channel in a non-visible region and a conductive channel in a visible region of a touch conductive film according to the present disclosure.
Figure 12:
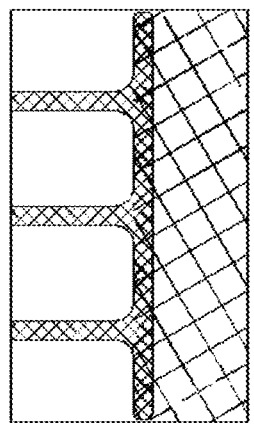

Further, as shown in FIG. 7, the visible region 11 is arranged with multiple conductive channels 42 insulated from each other and multiple non-conductive channels 43 formed by cutting the conductive grid. The non-visible region 12 is arranged with multiple lead channels 44 insulated from each other. The structure of the non-conductive channel 43 in the visible region 11 is as shown in FIG. 10. The connection between the conductive channel 42 in the visible region 11 and the lead channel 44 in the non-visible region 12 is as shown in FIG. 11 and FIG. 12. The conductive channel is electrically connected to the outside via the lead channel 44. Referring to FIG. 11, one conductive channel 42 may be electrically connected to the outside via one lead channel 44. Further, referring to FIG. 12, in order to reduce resistance of the channels and enhance the reliability of the electrical connection, one conductive channel 42 may be electrically connected to the outside via multiple lead channels 44.

Figure 13:
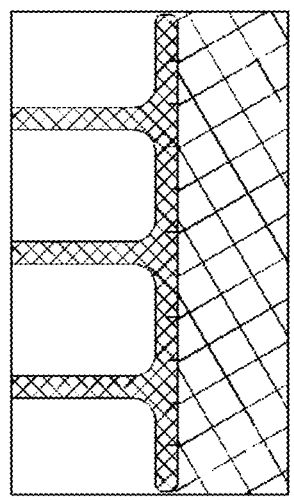
FIG. 13 is a schematic diagram showing another connection between lead channels in a non-visible region and a conductive channel in a visible region of a touch conductive film according to the present disclosure.

In order to further enhance the reliability of the electrical connection, auxiliary connecting wires may be arranged between the visible region 11 and the non-visible region 12, as shown in FIG. 13. The auxiliary connecting wires are integrally formed with the conductive grid in the visible region 11 and the conductive grid in the non-visible region 12.

Figure 14:
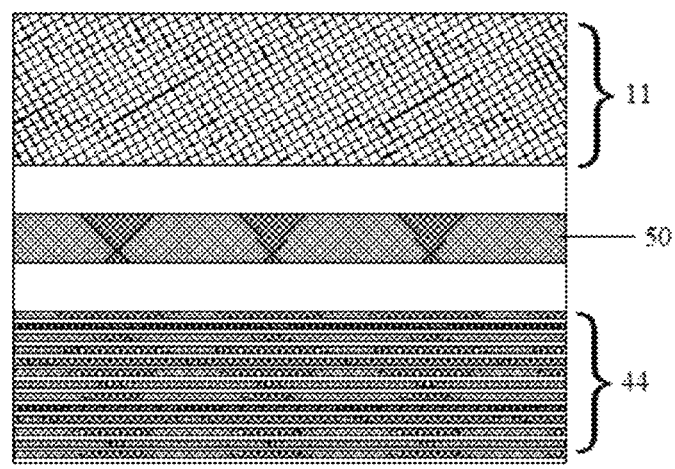
FIG. 14 is a schematic structural diagram of a shielding wire of a touch conductive film according to the present disclosure.
Figure 15:
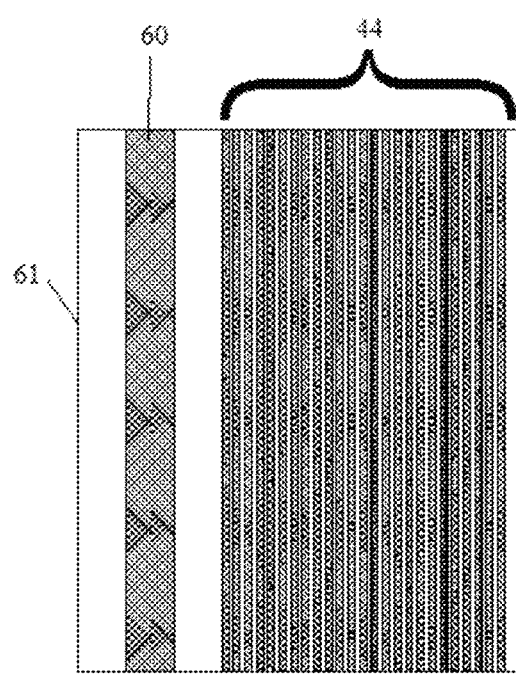
FIG. 15 is a schematic structural diagram of another shielding wire of a touch conductive film according to the present disclosure.

The non-visible region 12 may also be arranged with a grounded shielding line 50. As shown in FIG. 14, the grounded shielding line 50 is arranged between the visible region 11 and the lead channels 44. In another embodiment, as shown in FIG. 15, the grounded shielding line 60 is arranged between the lead channels 44 and an edge 61 of the touch conductive film. The grounded shielding wires 50 and 60 may be used to avoid the electromagnetic interference to improve the application quality of the touch conductive film.

A touch module using the touch control film is further provided according to the present disclosure. The touch module includes, for example, a glass substrate and a touch conductive film attached to the glass substrate, details are not described herein again.

Further, a display device using the touch conductive film is provided according to the present disclosure. Specifically, the display device is a touch display device, which may use the touch module, details are not described herein again.

Specific embodiments described in the present disclosure are merely illustrative description for the spirit of the present disclosure. It will be apparent to those skilled in the art to which this invention pertains that various modifications, additions and alternatives may be made to the described specific embodiments without departing from the spirit of the invention or as defined in the appended claims.

The invention claimed is:

1. A touch conductive film, comprising a substrate and conductive grids formed on the substrate, wherein a conductive grid in a visible region of the substrate is integrally formed with a conductive grid in a non-visible region of the substrate, wherein the visible region is arranged with a plurality of first grooves, the non-visible region is arranged with a plurality of second grooves, the conductive grid in the visible region and the conductive grid in the non-visible region are respectively arranged in the first grooves and the second grooves, and wherein the visible region is arranged with a plurality of conductive channels insulated from each other and a plurality of non-conductive channels formed by cutting the conductive grid, and the non-visible region is arranged with a plurality of lead channels insulated from each other.

2. The touch conductive film according to claim 1, wherein a distance between adjacent first grooves is greater than a distance between adjacent second grooves.

3. The touch conductive film according to claim 2, wherein the distance between adjacent first grooves is 10 times to 50 times of the distance between adjacent second grooves.

4. The touch conductive film according to claim 1, wherein longitudinal sections of the first grooves are rectangles, inverted trapezoids, or a combination of rectangles and inverted trapezoids; or longitudinal sections of the second grooves are rectangles, inverted trapezoids, or a combination of rectangles and inverted trapezoids; or longitudinal sections of the first grooves and the second grooves are rectangles, inverted trapezoids, or a combination of rectangles and inverted trapezoids.

5. The touch conductive film according to claim 4, wherein each of the inverted trapezoids has a greater width at an opening than at a bottom.

6. The touch conductive film according to claim 1, wherein each of grid units of the conductive grids has a rectangular shape, a rhombus shape, or an irregular shape.

7. The touch conductive film according to claim 1, wherein the substrate comprises a base layer and a UV adhesive layer, the UV adhesive layer is arranged on the base layer, and the first grooves and the second grooves are arranged on the UV adhesive layer.

8. The touch conductive film according to claim 1, wherein each of the first grooves in the visible region extends to a second groove in the non-visible region.

9. The touch conductive film according to claim 1, wherein auxiliary connecting wires are arranged between the visible region and the non-visible region, the auxiliary connecting wires are integrally formed with the conductive grid in the visible region and the conductive grid in the non-visible region.

10. The touch conductive film according to claim 1, wherein each of the conductive channels is electrically connected to the outside via a lead channel, and one conductive channel is electrically connected to the outside via one or more lead channels.

11. The touch conductive film according to claim 1, wherein the non-visible region is arranged with a grounded shielding line, the grounded shielding line is arranged between the visible region and the lead channels, or is arranged between the lead channels and an edge of the touch conductive film.

12. A touch module, comprising a touch conductive film, wherein the touch conductive film comprises a substrate and conductive grids formed on the substrate, and a conductive grid in a visible region of the substrate is integrally formed with a conductive grid in a non-visible region of the substrate, wherein the visible region is arranged with a plurality of first grooves, the non-visible region is arranged with a plurality of second grooves, the conductive grid in the visible region and the conductive grid in the non-visible region are respectively arranged in the first grooves and the second grooves, and wherein the visible region is arranged with a plurality of conductive channels insulated from each other and a plurality of non-conductive channels formed by cutting the conductive grid, and the non-visible region is arranged with a plurality of lead channels insulated from each other.

13. A display device, comprising a touch conductive film, wherein the touch conductive film comprises a substrate and conductive grids formed on the substrate, and a conductive grid in a visible region of the substrate is integrally formed with a conductive grid in a non-visible region of the substrate, wherein the visible region is arranged with a plurality of first grooves, the non-visible region is arranged with a plurality of second grooves, the conductive grid in the visible region and the conductive grid in the non-visible region are respectively arranged in the first grooves and the second grooves, and wherein the visible region is arranged with a plurality of conductive channels insulated from each other and a plurality of non-conductive channels formed by cutting the conductive grid, and the non-visible region is arranged with a plurality of lead channels insulated from each other.

* * * * *